Oct. 26, 1943. H. TANNHEIM 2,332,950

PROCESS OF ELECTRIC WELDING

Filed Aug. 22, 1940

INVENTOR
HUGO TANNHEIM
BY
ATTORNEY

Patented Oct. 26, 1943

2,332,950

UNITED STATES PATENT OFFICE 2,332,950

PROCESS OF ELECTRIC WELDING

Hugo Tannheim, Munich, Germany; vested in the Alien Property Custodian

Application August 22, 1940, Serial No. 353,745
In Germany September 21, 1939

2 Claims. (Cl. 219—10)

This invention relates to electric welding and more particularly to an automatic electric welding system using a metal electrode.

In automatic electric welding processes both of the arc welding type and of the type in which the welding heat is produced by passing an electric current from a welding rod to the work through a prefused granular mineral welding material of relatively high electrical resistance, suitable equipment is provided to regulate the rate of feeding the rod in accordance with the welding current or welding voltage. For example, the voltage drop between the welding rod and the work may be impressed directly on the armature of the rod feeding motor, or may be impressed on mechanical or electrical relays controlling the operation of the feeding motor. In either event, special apparatus is required to regulate the feeding rate of the welding rod to correspond to the melting rate of the rod.

The control equipment is relatively expensive and complicated. This is particularly true when the welding speed is high or when thick plates are to be welded in a single pass. In the latter case, the rod feeding motor must feed relatively large diameter rods at high speed, so that the power requirement of the motor, and therefore the power to be controlled by the control apparatus, attain a relatively high value.

It is therefore among the objects of this invention to provide an automatic electric welding process in which special equipment to regulate the feeding rate of the welding rod is not necessary; to provide an automatic electric welding process in which the welding rod is fed to the work at a predetermined constant speed and the welding energy is varied to consume the rod at a rate sufficient to maintain constant the distance between the rod and the work; to provide an automatic electric welding process in which a source of welding energy is used whose output is dependent on the welding voltage; and to provide a simplified automatic electric welding and control system.

Figure 1:
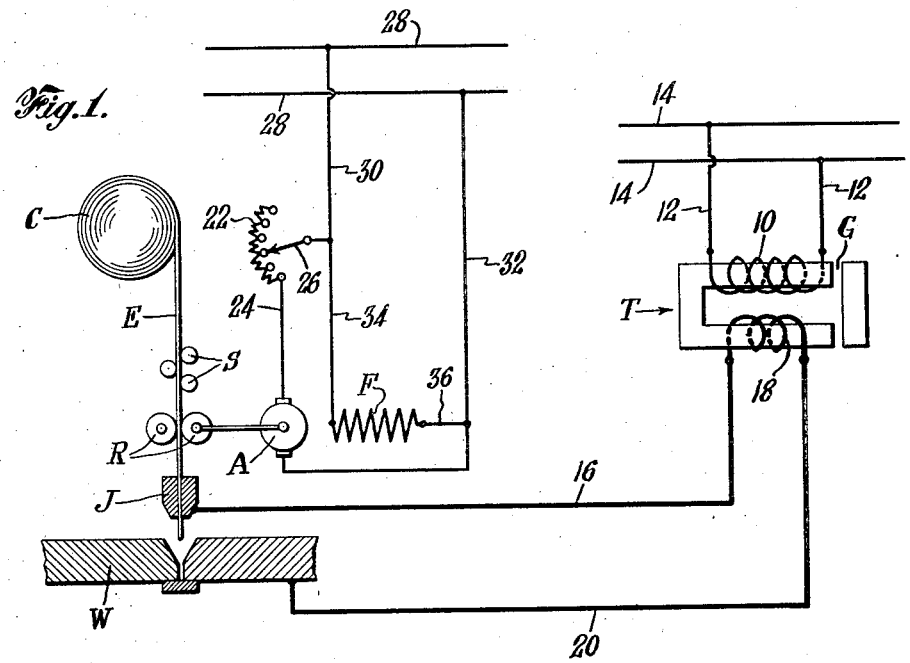
Figure 2:
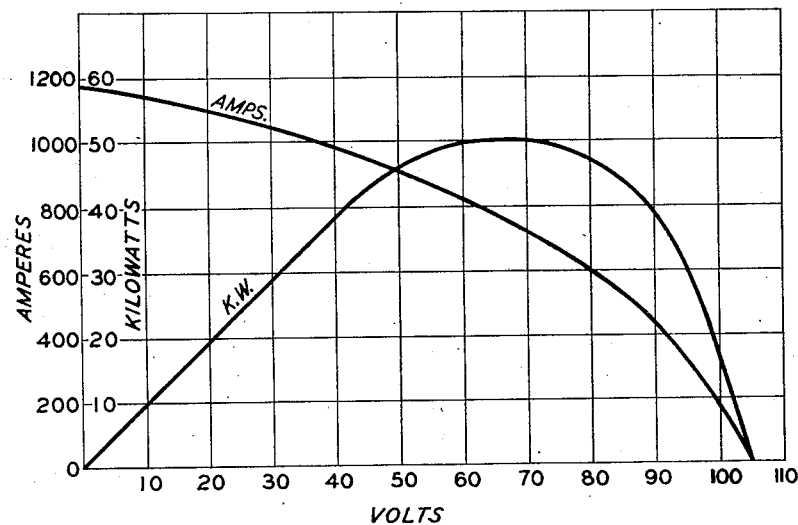

These and other objects of the invention will in part be obvious and in part become apparent from the following description and accompanying drawing, in which:

Fig. 1 diagrammatically illustrates an automatic electric welding circuit embodying the principles of the invention; and Fig. 2 diagrammatically illustrates the relationship between the welding voltage and the output of the source of welding energy.

According to the principles of the invention, the welding rod or electrode is fed toward the work at a predetermined constant speed, and the electric energy supplied to the welding circuit is so varied that the rod is consumed at a rate proportional to its rate of feed. The distance between the end of the rod and the work, and also the electrical constants of the transition point of the welding current, are thereby maintained at a uniform value. The electric energy preferably is delivered to the welding circuit from a leakage transformer, or any other power source having similar electrical characteristics, whose output is dependent upon the welding voltage. The welding voltage, in turn, is influenced by the distance between the welding rod and the work.

Referring more particularly to the drawing, in Fig. 1 a metal electrode or welding rod E is illustrated in operative relation to work W. The electrode E is arranged on a coil C and is fed or advanced to the work through straightening rolls S, driving rolls R, and current-carrying contact jaws J. The rolls R preferably are driven by suitable feeding means, such as a shunt wound motor having an armature A connected, as by a shaft, to at least one of the rolls R, and a shunt field winding F. Energy for the welding circuit preferably is supplied from a leakage transformer T having an air gap G.

Primary winding 10 of transformer T is connected to mains 14, 14 by conductors 12, 12. A conductor 16 connects one side of secondary winding 18 to jaws J and a conductor 20 connects the other side of the secondary winding to work W, to establish a potential between rod E and work W.

One side of armature A is connected to an adjustable speed-regulating rheostat 22 by a conductor 24, and the movable contact 26 of the rheostat is connected to one main 28 by a conductor 30. The other side of the armature is connected to the other main 28 by a conductor 32. Field winding F is connected to conductors 30 and 32 by conductors 34 and 36, respectively.

The operation of the invention will be apparent by reference to Fig. 2, which illustrates the relationship between the voltage drop across the welding zone and the output of the transformer T. By reference to the KW-volt curve it will be seen that the maximum output of the transformer T occurs at approximately 70 volts drop across the welding zone. In accordance with the principles of the invention, the rheostat 22 is adjusted so that the rate of rod feed is sufficient to maintain the welding voltage at approximately 80 volts. Now, if a change occurs in the electrical characteristics at the welding zone, such as an increase in the distance between the electrode E and the work W, the resistance at the transition point of the current and therefore the voltage drop becomes greater. Referring to Fig. 2, it will be seen that an increase in the welding voltage beyond the 70 volt point, results in a decrease in the energy output of the transformer.

The energy output of the transformer governs the rate at which the welding rod or electrode is consumed. A decreased energy output will reduce the rate at which the welding rod is melted so that if the existing speed of rod feed is maintained it will be sufficient to bring the end of the welding rod nearer to the work. When a predetermined spacing is again attained the voltage drop across the welding zone will again be 80 volts. The same thing applies in the reverse case. If the welding voltage for any reason becomes lower, then the output of transformer T will be increased. This will increase the rate at which the rod is melted until such time as an equilibrium has been established between the rate of rod consumption and the output of the transformer.

It will be apparent that once provision has been made so that the welding voltage is at a value which lies above the maximum output of the transformer, the welding operation will take place in a stable operating range of the transformer. In order to insure operation in this self-regulating stable range, suitable precautions should be taken in starting the weld. The stable range will always be attained when the speed of rod feed during the starting period is appreciably lower than the speed at which the rod is consumed.

In starting the weld, therefore, a rate of rod feeding is established which is less than the rate at which the rod is consumed. When the welding has been started, there will be at first an appreciable rise in the welding voltage due to the fact that the distance between the rod or electrode and the work is steadily increasing. The speed of the feed motor is thereupon increased until the welding voltage attains a value which lies slightly above the break in the energy output curve of the transformer. After a starting period of a few seconds, this value will be attained and then the motor is regulated to run at a constant speed. The regulation of the welding voltage now proceeds entirely automatically as explained above.

The minimum difference between the welding voltage and the maximum output voltage of the transformer which may be used, depends upon the extent of the irregularities that may be expected. In any event, the available voltage difference up to the maximum must provide a sufficiently large control range of the speed at which the rod or electrode melts. In order to minimize the effect of any irregularities that can occur in the feeding of the rod, a feeding motor, whose speed is as independent as possible of the load, is employed. Preferably, a shunt-motor having a field containing a suitable compound winding is used.

Below the voltage at which the transformer delivers its greatest output (in the present case: 70 volts), lies the unstable range. In this range, a change in the welding voltage effects the output of the transformer in such a way that the voltage is varied further in the direction of the deviation. When operating in the unstable range, every disturbance, even the smallest, will lead to interruption of the welding action. Either the rod finally will be welded fast to the plate, or the rate of feeding of the rod will no longer correspond with the rate of rod consumption and the distance between the rod and the work will reach an inoperative value. In this unstable range, it is therefore possible to weld only by providing additional control apparatus to regulate the feeding of the welding rod so that the conditions in the welding zone are maintained at a constant value.

The voltage at which the transformer delivers its maximum output can, in the present case, be established by changing the air gap. By so doing, and by changing the no-load voltage, it is possible to suit the characteristics of the leakage transformer to the type of welding and the rate of feeding required at the time.

In place of the leakage transformer, other devices may be used. For example, it is possible to use an ordinary single-phase transformer in series with a leakage choke coil. In this case, the regulation is effected preferably through varying the leakage flow of the choke coil. Another expedient is to use a welding dynamo or generator having suitable characteristics. It will be apparent therefore that the application of the process is in no way limited to the specific embodiment shown or even to alternating current welding.

While a specific embodiment of the invention has been illustrated, it will be obvious to those skilled in the art that the invention may be otherwise embodied within the scope of the appended claims.

What is claimed is:

1. A process of electric welding which comprises connecting the work to be welded and a metal welding rod to opposite terminals of a source of power whose energy output decreases above a certain voltage; feeding said welding rod toward the work at a constant speed such that the distance between the rod and the work will increase due to consumption of the rod; and then increasing the feeding speed of the rod to a substantially constant value sufficient to establish a welding voltage at least slightly in excess of such certain voltage.

2. A process of electric welding with a welding rod which comprises supplying an electric welding potential from a source of power whose energy output decreases above a certain voltage, feeding said welding rod toward the work to be welded at a substantially constant speed such that the distance between the rod and the work will increase due to consumption of the rod, so that there will be an appreciable rise in the welding voltage due to the increase in the distance between the welding rod and the work; thereupon increasing the feeding speed of said welding rod until the welding voltage attains a predetermined value which is at least slightly in excess of said certain voltage; and then feeding said welding rod toward the work at a substantially speed corresponding to the speed at which the welding voltage attains such predetermined value.

HUGO TANNHEIM.